(12) United States Patent
Whyte

(10) Patent No.: US 11,849,223 B2
(45) Date of Patent: Dec. 19, 2023

(54) TIME OF FLIGHT CAMERA DATA PROCESSING SYSTEM

(71) Applicant: CHRONOPTICS LIMITED, Hamilton (NZ)

(72) Inventor: Refael Zabdi Whyte, Hamilton (NZ)

(73) Assignee: CHRONOPTICS LIMITED, Hamilton (NZ)

( * ) Notice: Subject to any disclaimer, the term of this patent is extended or adjusted under 35 U.S.C. 154(b) by 355 days.

(21) Appl. No.: 17/416,753

(22) PCT Filed: Dec. 20, 2019

(86) PCT No.: PCT/NZ2019/050162
§ 371 (c)(1),
(2) Date: Jun. 21, 2021

(87) PCT Pub. No.: WO2020/130855
PCT Pub. Date: Jun. 25, 2020

(65) Prior Publication Data
US 2022/0078342 A1 Mar. 10, 2022

(30) Foreign Application Priority Data
Dec. 21, 2018 (NZ) ...................................... 749550

(51) Int. Cl.
*G06T 7/521* (2017.01)
*H04N 23/80* (2023.01)
(Continued)

(52) U.S. Cl.
CPC .......... *H04N 23/80* (2023.01); *G01S 17/894* (2020.01); *G06T 5/002* (2013.01); *G06T 5/009* (2013.01);
(Continued)

(58) Field of Classification Search
None
See application file for complete search history.

(56) References Cited

U.S. PATENT DOCUMENTS 8,587,771 B2    11/2013  Xu et al.
9,100,640 B2     8/2015  Boross et al.
(Continued)

OTHER PUBLICATIONS

International Search Report issued in PCT/NZ2019/050162; dated Feb. 26, 2020.
(Continued)

*Primary Examiner* — Oschta I Montoya
(74) *Attorney, Agent, or Firm* — Studebaker & Brackett PC

(57) ABSTRACT

In one aspect the invention provides a time of flight camera data processing system incorporating a management processor structure capable of communicating configuration information to and/or from a waveform generator used by the time of flight camera. A depth circuit structure is also provided which is configured to receive raw image frame data supplied by a sensor of the time of flight camera, the raw image frame data defining an array of pixels. The depth circuit structure is configured to translate the raw image frame data of one or more pixels into complex components, and the management processor structure being configured to communicate configuration information and/or to issue operational instructions to the depth circuit structure. The depth circuit structure is arranged to output distance and amplitude information derived from at least one received raw image data frame.

15 Claims, 5 Drawing Sheets

(51) Int. Cl.
  *G01S 17/894*  (2020.01)
  *G06T 5/00*  (2006.01)
  *G06T 5/20*  (2006.01)

(52) U.S. Cl.
  CPC ............... *G06T 5/20* (2013.01); *G06T 7/521* (2017.01); *G06T 2207/10028* (2013.01)

(56) References Cited

U.S. PATENT DOCUMENTS

| | | |
|---|---|---|
| 9,739,609 B1 | 8/2017 | Lewis |
| 9,812,486 B2 | 11/2017 | Lin et al. |
| 10,557,921 B2 | 2/2020 | Bleyer et al. |
| 2015/0334318 A1 | 11/2015 | Georgiev et al. |
| 2017/0287218 A1* | 10/2017 | Nuernberger ....... G06F 3/04845 |
| 2018/0210070 A1 | 7/2018 | Bleyer et al. |
| 2018/0341008 A1 | 11/2018 | Ortiz Egea |
| 2019/0096069 A1* | 3/2019 | Qian ..................... G06T 7/74 |
| 2019/0107626 A1* | 4/2019 | Matsuura .............. G01S 17/894 |
| 2019/0392205 A1* | 12/2019 | Tang ..................... G06T 7/55 |
| 2020/0175761 A1* | 6/2020 | Jones .................... G02B 27/017 |
| 2020/0193614 A1* | 6/2020 | Tadi ..................... G06T 19/20 |

OTHER PUBLICATIONS

Drayton, B.M.M, "Algorithm and design improvements for indirect time of flight range imaging cameras", Victoria University of Wellington, 2013.

Hansard, M. et al., "Time-of-flight cameras: principles, methods and applications", SpringerBriefs in Computer Science, 2012.

Introduction to the Time-of-Flight (ToF) System Design [retrieved from internet Feb. 10, 2020]. < URL: http://www.ti.com/lit/ug/sbau2I9d/sbau2I9d.pdf>, published May 2014.

* cited by examiner

TIME OF FLIGHT CAMERA DATA PROCESSING SYSTEM

FIELD OF THE INVENTION

This invention relates to a time of flight camera data processing system. In preferred embodiments the invention may be used to process raw time of flight sensor data to provide improvements over the prior art in performance and/or manufacturing costs. In additional embodiments the system provided may also perform time of flight camera control and configuration functions in addition to the processing of raw sensor data.

BACKGROUND OF THE INVENTION

Current state-of-the-art Time-of-Flight (herein 'ToF') depth sensor camera systems consist of a pixel based sensor, an illumination source, a system controller, and a computation unit. To measure depth, the illumination source emits a pulse of light into the scene, and the pulse interacts with the scene. The resulting return reflected pulse is measured by the ToF sensor to capture an image 'frame' composed of an array of pixels.

For indirect ToF distance measurements the phase difference between the emitted pulse and measured reflection encodes distance, and multiple measurements are required to generate depth information. This phase difference is representative of the extra distance travelled by measured reflected light pulses.

In the ideal case the measured light can be expressed as $$s(t) = a \sin(\omega t - \phi) + b$$

Where a is the amplitude of the measured light, ω encodes the modulation frequency of the emitted light, φ encodes the distance travelled by a phase shift, and b is the background radiation. To deduce the phase shift of the measured light the ToF pixel correlates the measured light with a reference signal g(t), which is normally another sinusoidal signal with the same modulation frequency:

$$g(t) = \sin(\omega t)$$

Each pixel in an indirect ToF imaging sensor performs the correlation, where the correlation of s(t) and g(t) is $$h(\tau) = \frac{a}{2}\cos(\omega \tau + \phi) + b$$

where ωT encodes the phase of the reference signal g(t) relative to the emitted signal. Multiple measurements of the correlation signal, h(τ), are taken by phase shifting the reference signal N times, where each individual measurement is called a raw frame and is composed of an array of raw pixel data. In the above equation there are three unknowns so at least three raw frames are required to calculate the phase, and typically four are used as this reduces the computational complexity. The relationship between phase and radial distance d, is $$d = \frac{c\phi}{2\omega}$$

where c is the speed of light. The maximum distance that can be measured is when the phase is 2π, and wraps back to 0. The maximum distance is therefore $$d_m = \frac{c}{2f}$$

To recover the unknowns from the correlation function the measured samples h(τ$_n$) are separated into their real and imaginary components.

$$I = \sum_{n=1}^{N} h(\tau_n)\sin(\tau_n)$$

$$Q = \sum_{n=1}^{N} h(\tau_n)\cos(\tau_n)$$

The phase and amplitude can be recovered from the real and imaginary components by $$\phi = \tan^{-1}\left(\frac{I}{Q}\right)$$

$$a = \frac{\sqrt{I^2 + Q^2}}{2}$$

These are the basic steps used in computing the distance from the ToF sensor. However, for an accurate and robust depth measurement additional processing is required. This processing is required for every pixel in the ToF image sensor. As image sensor sizes continue to increase the computational load is massively increasing as well. Different processing techniques and the reasons they are used are explained in brief below.

For an accurate distance measurement calibration is required. The effect of temperature, distance, reflectivity, per-pixel variance, and lens distortions all need to be accounted for to obtain the most accurate results possible.

In addition to calibration there are additional configuration and processing steps that have been developed to improve the distance measurement. These improvements normally require a change to emitted optical signal, reference signal, and order of acquisition of the raw measurements.

For example, high dynamic range is a configuration where two frames of different integration times are combined. In these cases the time periods (integration times) over which the camera light sensor is allowed to accumulate charges sourced from photon impacts is differed over two different frames. This enables bright highly reflective objects to be imaged along with normal reflectivity objects. Otherwise, the highly reflective objects would cause the pixels to saturate. High dynamic range requires configuration of the sensor and illumination, and additional processing to combine the measurements.

Multi-path interference causes problems for ToF range measurements. It is caused when there are many return path distances to a single pixel. There have been many suggested solutions and fixes to the error caused by multi-path interference which include calibration, measurements at multiple modulation frequencies, and changing the illumination optics. Attempts to address this source of the error again increases computational load placed on time of flight camera data processing systems.

Phase unwrapping is a technique to extend the maximum range of ToF sensors. The maximum measurable distance is determined by the modulation frequency. The maximum distance can be extended by taking measurements at two or more modulation frequencies. For long range imaging applications this is a useful feature.

Motion correction is the process of resolving the error introduced by motion. As ToF sensors require multiple raw measurements to calculate distance, any change caused by motion between raw measurements introduces errors.

Binary sequences have been used instead of the pure sinusoidal signals described in the above equations. They have demonstrated the capacity to image through smoke, resolve multi-path interference and enable multiple camera operation with minimum interference. A configurable time of flight camera system and associated data processing system is required to allow for the selection and use of such an arbitrary binary sequence.

Filtering of the ToF data improves the measurement quality. There have been numerous proposed filtering schemes for ToF cameras, and in the future more will very likely be developed.

With anticipated captured image frame sizes increasing depth calculation becomes computationally expensive, and memory intensive. The additional calibration, filtering and processing can require overly expensive hardware solutions to perform for some 3D imaging applications, particularly in circumstances where depth information needs to be provided in real time.

It would therefore be of advantage to have improvements over the prior art which mitigated the above issues or at least provide an alternative choice over the prior art. Furthermore, it would be of advantage to have an improved time of flight camera data processing system which exhibited performance improvements, operational flexibility improvements and/or manufacturing cost improvements over the prior art. It would also be of advantage to have a data processing system which could be readily configured to apply a number of possible data processing techniques, and potentially which could also control the functioning of an associated time of flight camera system.

DISCLOSURE OF THE INVENTION

According to one aspect of the present invention there is provided a time of flight camera data processing system which includes a management processor structure capable of communicating configuration information to and/or from a waveform generator used by the time of flight camera, and
 a depth circuit structure configured to receive raw image frame data supplied by a sensor of the time of flight camera, the raw image frame data defining an array of pixels,
 the depth circuit structure being configured to translate the raw image frame data of one or more pixels into complex components, and the management processor structure being configured to communicate configuration information and/or to issue operational instructions to the depth circuit structure,
 the depth circuit structure being arranged to output distance and amplitude information derived from at least one received raw image data frame.

Preferably the system includes at least one memory structure addressable by either or both of the depth circuit structure and the management processor structure.

Preferably the depth circuit structure stores the complex components of pixels of received raw image data frames within the memory structure as integer data types.

According to another aspect of the present invention there is provided a time of flight camera data processing system substantially as described above wherein the depth circuit structure defines
 a plurality of pipeline structures arranged to concurrently process a plurality of received raw image data frames.

Preferably a pipeline structure defines a complex data translation sub-structure.

Preferably a pipeline structure defines a calibration sub-structure.

Preferably a pipeline structure defines a filtering sub-structure.

Preferably a pipeline structure defines or communicates with a transformation process sub-structure Preferably a pipeline structure shares a transformation process sub-structure with at least one other pipeline structure.

According to a further aspect of the present invention there is provided a time of flight camera data processing system substantially as described above wherein a calibration sub-structure executes a single calibration function on the complex components of a pixel of a received raw image data frame to apply a correction for fixed phase offset and temperature phase offset errors.

According to another aspect of the present invention there is provided a time of flight camera data processing system substantially as described above implemented at least in part by computer executable instructions stored on computer readable media.

According to a further aspect of the present invention there is provided a time of flight camera data processing system substantially as described above 1 implemented at least in part by a circuit assembly.

The present invention is arranged to provide a data processing system for use with a time of flight camera. Time of flight cameras assess propagation delays experienced by light reflected from a scene of interest to derive depth or distance information for the components of the scene.

Reference in general throughout this specification will be made to the invention being used in combination with time-of-flight cameras in general. Those skilled in the art will appreciate that time-of-flight cameras are well known technology and the invention can be used with various implementations of such camera systems.

The invention provides a data processing system which can act on raw time of flight camera sensor data to provide depth information. The system provided is composed of a number of structures (and in various preferred embodiments additional sub-structures) which are used to implement the processing operations required to provide depth information.

References made throughout this specification to the terms system, structure or substructure encompass a variety of possible implementations of the invention. The system provided through such structures can be implemented using customised hardware components, or through the provision of a set of executable instructions—or a hybrid combination of both customised hardware and controlling executable instructions run on a processor. Those skilled in the art will appreciate that the exact form of implementation used will vary over different applications depending on performance requirements. Issues such as implementation cost, space and power consumption requirements, in addition to the capability to reconfigure or extend the processing operations undertaken may all dictate the type of implementation deployed.

For example, in various embodiments one or more of these structures may be implemented with an application specific integrated circuit (ASIC), field programmable gate arrays (FPGA) or any other similar technology processing technology which does not need to allow for the frequent or dynamic modification of the process being executed.

In other embodiments one or more structures may be implemented through a set of executable instructions loaded to a microprocessor, CPU or similar relatively generic processor hardware. Although this is a less power, space and cost efficient implementation than customised hardware the operations executed can easily be modified and potentially extended on demand by users.

In yet other embodiments a hybrid implementation of a structure or structures may be provided using a combination of a flexibly reconfigurable processor loaded with executable instructions which is coupled to various additional structures implemented in fixed hardware components. For example, System on Chip (SoC) and Image Signal Processors (ISP's) can be utilised in such implementations with a readily reconfigurable processor programmed with instructions to control the operation of dedicated customised hardware components tasked with performing common processing functions.

Those skilled in the art will therefore appreciate that the terms system and structure or substructures is utilised throughout this specification encompasses the potential for hardware, software instruction or hybrid implementations of such components of the invention.

The data processing system provided by the invention includes a management processor structure in communication with a waveform generator used by the time of flight camera. The management processor structure may preferably be arranged to provide configuration information to this waveform generator to control the operation and performance of this component, and therefore the operation and performance of the associated time of flight camera. Those skilled in the art will also appreciate that this communication may be undertaken through a further intermediate component, such as for example, a further controller embedded in or associated with the waveform generator.

Furthermore in various embodiments such configuration or control information may also be supplied from the waveform generator to the management processor structure. This communication facility therefore allows the management processor structure to control the operation of the time of flight camera system and to also obtain information about the performance or operation of the time-of-flight cameras.

In one preferred embodiment of the invention the data processing system provided may also incorporate or implement such a waveform generator. Those skilled in the art will appreciate that well-known circuit design procedures may be followed to implement such a component in combination with the present invention.

In a preferred embodiment the invention's management processor structure may also be configured to communicate configuration information or to issue operational instructions to a depth circuit structure provided by the invention. In such embodiments the management processor may preferably control the operation and performance of the invention's depth circuit structure and may also reprogram, reconfigure or adjust more processes run by the depth circuit structure.

In a preferred embodiment the data processing system provided by the invention may include at least one memory structure. This memory structure may be addressed by either or both of the management processor structure and/or depth circuit structure, allowing these components to read or write data to memory locations defined the memory structure.

In a further preferred embodiment the data processing system may include a single memory structure only where the memory locations defined by the structure may be addressed by both the processor structure and depth circuit structure. The single memory structure may service both of these components and can also facilitate communications or the provision of data between these components.

Reference in general throughout this specification will also be made to the invention incorporating a single memory structure addressable by both the management processor structure and depth circuit structure. However those skilled in the art will appreciate that other arrangements are envisioned, with two or more separate and distinct memory structures capable of being used with various read and write permissions assigned to the remaining components of the invention.

Those skilled in the art will also appreciate that the memory structure may be implemented with a range of technologies generally falling within the description of random access memory.

Furthermore, reference will also be made throughout this specification to the management processor structure being implemented by a microprocessor or microcontroller. Again however those skilled in the art should appreciate that a range of technologies may be used to implement this component to provide a management processor structure capable of running user programed executable instructions.

The invention incorporates a depth circuit structure which is arranged to receive raw image frame data from an associated time-of-flight camera sensor. This raw frame data is provided as an array of pixels which represent light measurements recorded at the same time from the field of view of the sensor.

The depth circuit structure is configured to translate one or more pixels of raw image frame data into complex components. In preferred embodiments all the pixels of a received raw image frame may be translated into a set of complex components. In various embodiments the invention may provide complex components derived from a single pixel, or may utilise two or more pixels in a transformation which results in a single set of complex components.

Reference made throughout this specification to the translation of raw pixel data into a set of complex components should be construed as encompassing the use of any function which receives one (or more) pixel data point and deconstructs this data into mathematically orthogonal components. These mathematically orthogonal components are referred throughout this specification as the complex components provided by a pixel or pixels of raw data. Commonly referred to as a combined set of real and imaginary components, the complex components provided and manipulated in accordance with the invention may be formatted in different ways. For example, the complex components utilised by the invention may be presented as distinct real and imaginary number components, or alternatively may be formatted as an expression utilising modulus and phase to define the same information.

Those skilled in the art will appreciate that references made to complex components throughout this specification are illustrative of how the invention can translate pixel data into mathematically orthogonal components.

The translation of raw pixel data into complex components facilitates the depth circuit structure processing raw image pixel data to output distance and amplitude information. The output distance and amplitude information is therefore derived from at least one received raw image data frame.

In preferred embodiments the depth circuit structure defines at least one pipeline structure to process raw image data into its complex components and to output amplitude and depth information for this image data. A pipeline structure can be implemented to undertake a number of steps completed with respect to pixels to derive depth and amplitude information. In various embodiments these pipeline structures may potentially be optimised through hardware implementation of one or more of the essential steps of this process. In yet other embodiments pipeline structures may be implemented with computer executable instruction sets, or a hybrid combination of both hardware and instruction sets. These full or partial software based implementations can provide improved flexibility with the ability to reconfigure the operations executed by the system.

For example a pipeline structure or structures may be implemented with an application specific integrated circuit (ASIC), field programmable gate arrays (FPGA) or any other similar technology processing technology which does not need to allow for the frequent or dynamic modification of the process being executed. Furthermore in yet other embodiments a pipeline structure may also integrate a programmable microprocessor to provide additional flexibility in the configuration operation of this component.

In other embodiments a pipeline structure instructions may be implemented through a set of executable instructions loaded to a microprocessor, CPU or similar relatively generic processor hardware.

In yet other embodiments a hybrid implementation may be provided using a combination of a flexibly reconfigurable processor loaded with executable instructions which is coupled to various additional structures of the invention implemented in fixed hardware components. Those skilled in the art will appreciate that a variety of system on chip (SoC) and Image Signal Processors (ISP's) products can be utilised in such implementations.

In a preferred embodiment a memory structure provided with the invention may be addressed by the depth circuit structure to store complex pixel data components as integer datatypes. Integer datatypes have an efficient memory footprint, providing manufacturing cost and performance improvements to the resulting system. Furthermore through the implementation of a sequential pipeline of processes or operations this same complex pixel data can be read from a memory location, operated on by the components of the pipeline and then saved back to the same memory location to provide a minimised memory use footprint.

In a preferred embodiment a depth circuit structure may incorporate or define a plurality of pipeline structures. This plurality of pipeline structures can be arranged to concurrently process a plurality of received raw image data frames. The number of pipeline structures provided within the depth circuit structure can therefore be scaled depending on the application with which the invention is to be used and the performance required of the invention. The use of multiple pipelines can harness hardware optimisations implemented in each pipeline, scaling the efficiency improvements provided.

In a preferred embodiment each pipeline structure may define a complex data translation sub-structure. This sub-structure of the pipeline can be used to initially receive and translate raw camera sensor data into its complex components for further processing by other sub-structures of the pipeline.

In a preferred embodiment each pipeline structure may define a calibration sub-structure which undertakes a calibration process on the complex components of the pixels of received raw image data frames.

In a further preferred embodiment a calibration sub-structure may execute a single calibration function on the complex components of a pixel of a received raw image data frame to apply a correction for fixed phase offset and temperature phase offset errors. In such embodiments the pipelines calibration sub-structure may receive additional input parameters such as for example any one or more of phase information internal frame position information for a pixel and/or ambient temperature information.

In a preferred embodiment each pipeline structure provided by the invention may define a filtering sub-structure which undertakes a filtering process on the complex components of the pixels of received raw image data frames.

For example image filtering techniques can enhance an image, often by reducing noise, and most of such filters have or use parameters to control the operation or performance of the filter. For example, a 2D Gaussian filter normally has two input parameters, being its size and the standard deviation. The size sets the number of pixels filtered, and the standard deviation sets how aggressive the filter is at reducing noise by combining surrounding pixels with each other. In noisy images there are advantages of being more aggressive and in high quality images doing limited filtering. By either previously knowing the amount noise or by calculating it optimal filter parameters can by dynamically applied to suit particular circumstances.

Those skilled in the art will appreciate that many possible filtering options can be supported by this sub-structure, from median, bilateral, non-local means, wavelet, total variation, and linear filtering. These various candidate filtering processes can operate on the complex components of pixel data to improve the accuracy of depth and amplitude information provided by the invention. The filtering sub-structure is optimized for filtering the complex data stored in memory. In the case of wavelet filtering the chosen wavelets may be designed to enhance features in the data, such as spheres or planer surfaces.

In various filtering cases the filter parameters can be dynamically adjusted by an estimate of the amount of noise in the complex component data stored in association with the invention. This estimate of noise can come from the data itself, or another data source, such as an ambient light sensor. Those skilled in the art will appreciate that dynamic adjustment calculation of filter parameters may be performed within a filtering sub-structure or by the management processor structure. In various embodiments the invention may therefore dynamically adjust the parameters applied to a filtering operation to adjust its performance based on current circumstances or the environment of use of a time of flight camera.

In a preferred embodiment each pipeline structure provided by the invention may define or communicate with a transformation process sub-structure which undertakes a transformation process on the complex components of the pixels of received raw image data frames.

In a further preferred embodiment were a depth circuit structure incorporates or defines a plurality of pipeline structures each, pipeline structure may share a transformation process sub-structure with at least one other pipeline structure.

Those skilled in the art will appreciate that a wide range of transformation processes may be executed by such a sub-structure in various embodiments. For example any one or more combination of the following processes may be undertaken by this sub-structure in various embodiments:

High dynamic range processing
Multi-path interference correction processing
Phase unwrapping processing
Motion correction processing
Binary sequence driven captured image data processing The present invention may provide many potential advantages over the prior art.

The invention's provision of a depth circuit structure—and preferably a pipeline focused configuration of this component—can employ hardware implementations of essential processes. Essential steps in the processing of image data can be undertaken more efficiently with dedicated hardware solutions to improve the resulting performance of the invention and minimise its manufacturing costs. In other embodiments software focused implementations can be employed to provide for flexibility in and extensions of the processes executed. In yet other embodiments a combination of both executable instructions sets and dedicated customised hardware components may be deployed to utilise the advantages provided by both forms of these implementations.

The invention's provision of a management processor allows for flexibility in the configuration and operation of the depth circuit structure. Appropriate components can be selected in the implementation of the depth circuit structure, with the management processor being arranged to control the operation of these components, and potentially reconfigure the processes they undertake as required by the user.

In various preferred embodiment the invention may utilise Integer datatypes in the storage of complex image data. This approach, substantially reduces the memory demands of the invention, particularly when preferably combined with pipeline focused operations which can read and write complex pixel data back to the same memory location.

BRIEF DESCRIPTION OF THE DRAWINGS

Additional and further aspects of the present invention will be apparent to the reader from the following description of embodiments, given in by way of example only, with reference to the accompanying drawings in which.

Further aspects of the invention will become apparent from the following description of the invention which is given by way of example only of particular embodiments.

BEST MODES FOR CARRYING OUT THE INVENTION

Figure 1:
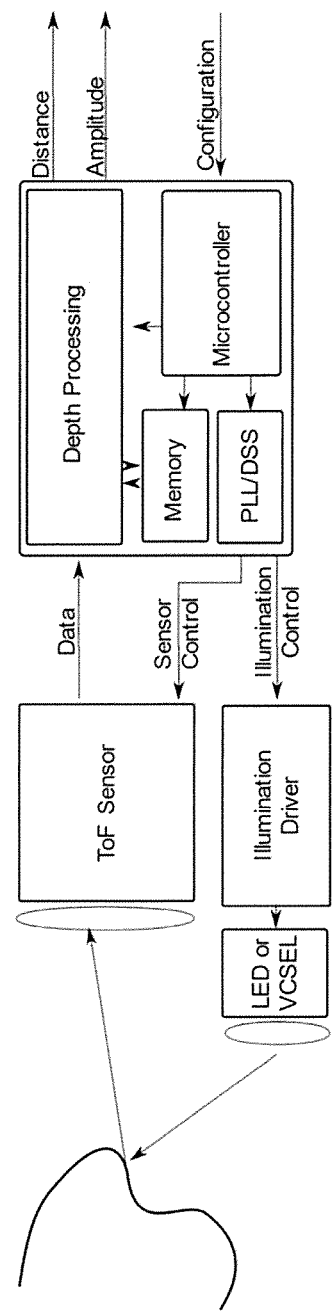
FIG. 1 shows a schematic diagram of a hardware implemented data processing system as provided in accordance with one embodiment of the invention.

FIG. 1 shows a schematic diagram of a time of flight camera data processing system as provided in accordance with one embodiment of the invention.

In the embodiment shown the system is provided by the combination shown, being of a management processor as provided by a microcontroller, depth circuit structure as identified as a depth processing component, a memory element and a waveform generator as identified as by the PLL/DSS component. Those skilled in the art will also appreciate that in alternative embodiments the waveform generator may optionally be provided external to the processing system and in communication with the management processor.

As can be seen from FIG. 1 the system receives image data from the time of flight sensor and issues sensor control instructions to the same sensor. Similarly, illumination control signals can be sent from the system to the illumination driver to control the characteristics of light transmitted towards a scene of interest. The system can also receive external configuration information, preferably from a user, and will provide, as outputs, distance and amplitude information for received time of flight sensor data.

The time of flight camera sensor and illumination components are used to record a measurement, called a raw frame using well known prior art techniques. This raw frame is composed of an array of raw data pixels which is initially supplied to the depth processing component for the subsequent provision of distance and amplitude information for each pixel.

The processing from raw data to distance information depends on the ToF sensor configuration, and other input configuration values which are provided to the depth processing unit by the management processor microcontroller.

As can also be seen from FIG. 1, the system includes a single memory element which can be addressed by both the depth processing unit and the management processor.

In this embodiment sensor control, illumination control, and the depth processing configuration is provided by the management processor microcontroller. The microcontroller controls the operation of the waveform generator circuit, which in turn generates the control signals used by the ToF sensor and illumination.

The management processor is reconfigurable, allowing for different sensor and illumination control schemes. This provides for easy configuration to enable different operating modes, such as high dynamic range, phase unwrapping and so forth, with the management processor providing the capacity to fine tune the operational configuration of the time of flight camera and depth processing unit for each application.

In the embodiment shown the depth processing unit is implemented by an application specific integrated circuit (ASIC), although those skilled in the art will appreciate that a FPGA, a CPU based implementation or any desired combination of these forms of components may be used in other embodiments.

Figure 2:
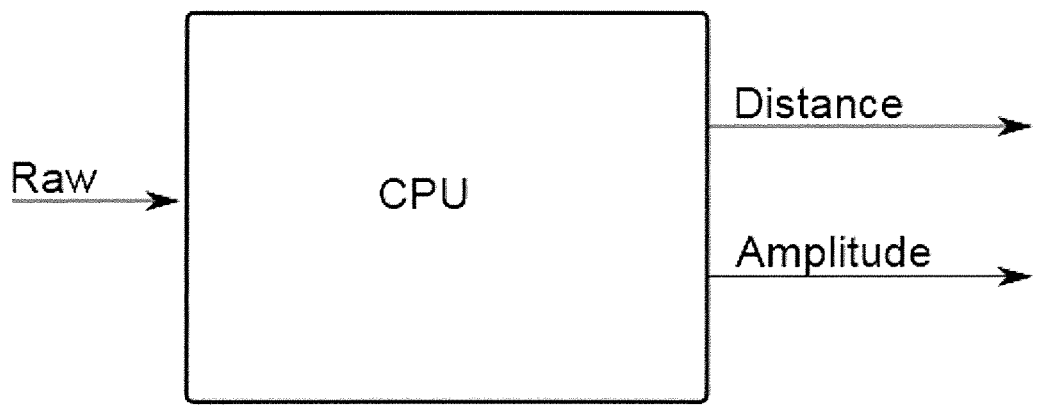
FIG. 2 shows a schematic diagram of a CPU based implementation of a depth circuit structure as an alternative to that referenced with respect to FIG. 1.
Figure 3:
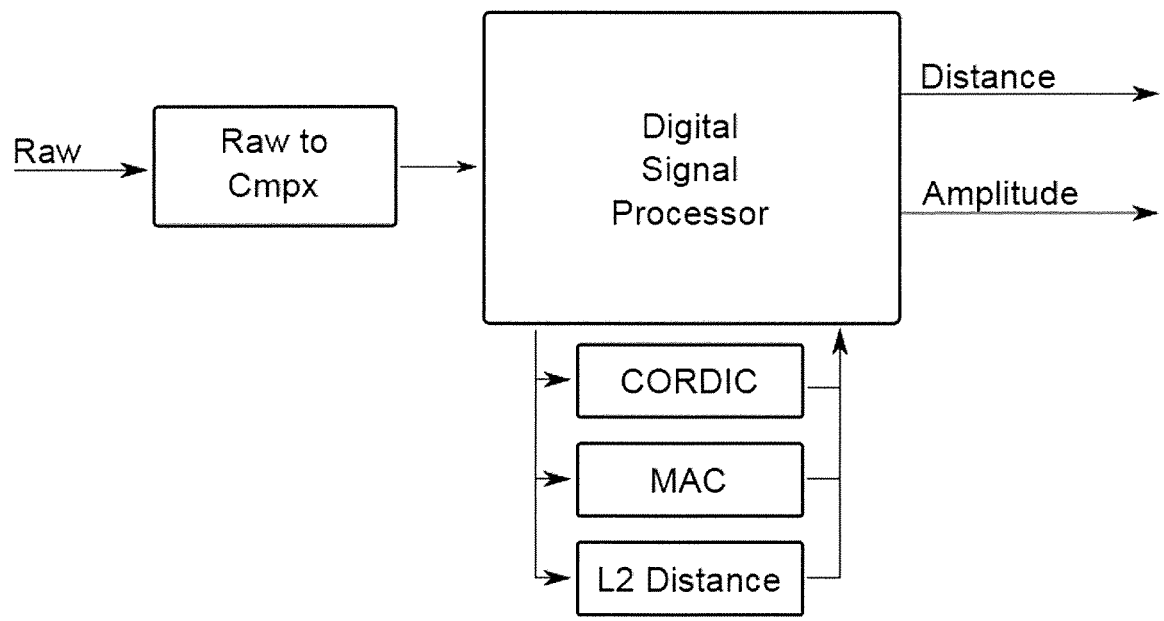
FIG. 3 shows a schematic diagram of a hybrid hardware and CPU based implementation of a depth circuit structure as an alternative to that referenced with respect to FIGS. 1 and 2.

This variation in the components which can be used to implement the depth processing unit and also the management processor microcontroller are illustrated by FIGS. 2 and 3.

FIG. 2 illustrates the provision of a single microprocessor based CPU employed to implement the functions of the management processor and depth processing unit through a set of executable instructions. In such embodiments the depth circuit structures discussed below with respect to FIGS. 4 and 5 are implemented solely by instructions run on the CPU shown.

FIG. 3 illustrates a hybrid implementation of the management processor and depth processing unit. In the implementation illustrated the digital signal processor is programmed with a set of executable instructions which are used to implement the functions of the management processor and most of the structures of the depth processing unit. Additional dedicated hardware circuits are coupled to the digital signal processor to provide a complex data translation sub-structure shown as the Raw to Cmpx component, and a calibration sub-structure shown as the CORDIC component. In the implementation shown the digital signal processor is also coupled to further dedicated hardware circuits L2 Distance—to perform Euclidean distance operations—and MAC—to perform optimised multiple accumulate operations undertaken during matrix multiplication processes.

Figure 4:
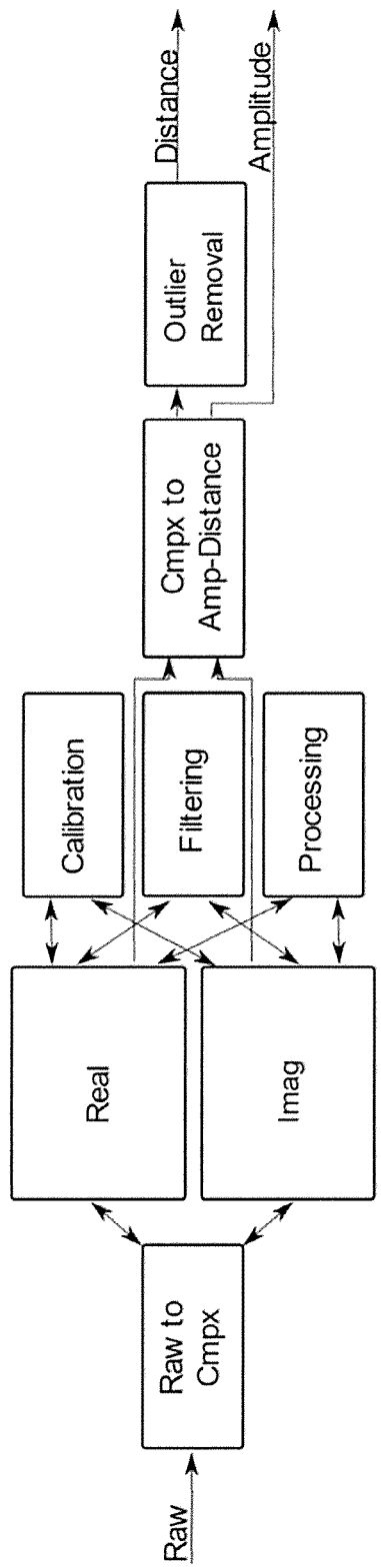
FIG. 4 shows a schematic diagram of components and structures which can be used to implement the depth circuit structures referenced with respect to FIGS. 1, 2 and 3.
Figure 5:
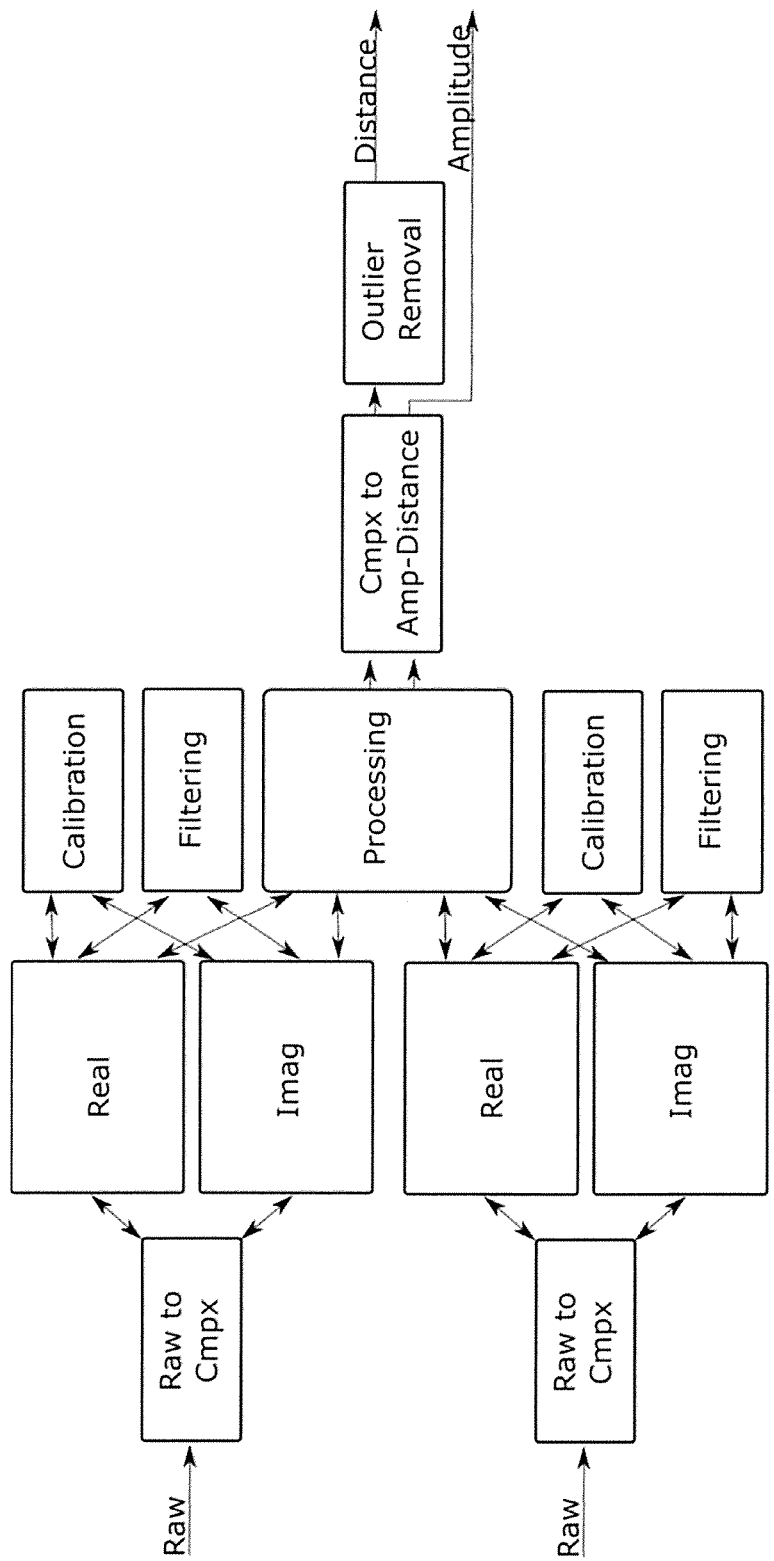
FIG. 5 shows a schematic diagram of a memory architecture for components used to implement an alternative depth circuit structure to that shown in FIG. 4 with this alternative implementation facilitating transformation processing using two complex frames.

FIG. 4 shows a schematic diagram of components or structures used to implement the depth circuit structure discussed with respect to FIGS. 1, 2 and 3. As identified above these various components or structures of the invention may be implemented by dedicated hardware components or executable instructions sets.

In the embodiment shown the depth circuit structure has a pipeline structure configuration with the raw data received undertaking a series of sequential processing steps to result in the output of distance and amplitude information for each pixel of a captured time-of-flight image frame.

The first step of this pipeline structure is provided by a complex data translation sub-structure, shown in FIG. 4 as the Raw to Cmpx component. Within this component the raw frames are converted to real and imaginary values (see FIG. 6 for further detail) by multiplying the incoming raw value by a pre-computed value, and accumulating the result in memory.

The Real and Imag blocks shown represent storage in a memory element, as illustrated with respect to FIG. 1. In the embodiment shown the complex real and imaginary components of pixels of received raw image data frames are stored within the memory structure as Integer data types.

Once the complex conversion is complete the real and imaginary values are calibrated, filtered and additional processing is applied. These functions are performed by calibration, filtering and transformation process sub-structures—shown in FIG. 4 as the calibration, filtering and processing components respectively.

FIG. 4 illustrates the provision of a single pipeline structure assembly for exemplary purposes only. In various additional embodiments two or more pipeline structures may be provided to implement the depth circuit structure. With this arrangement a plurality of pipeline structures can be provided to concurrently process a plurality of received raw image data frames.

Furthermore the transformation process sub-structure referenced above can be shared with or across two or more pipeline structures to extend the types of transformation processes which may be executed using image data from different frames.

In various embodiments transformation processing could consist of phase unwrapping, high dynamic range, and/or binning, for example.

As indicated above, each of the various processing blocks shown in FIG. 4 can be implemented as a hard-coded digital circuit, such as an ASIC or FPGA. Alternatively—as identified with respect to FIGS. 2 and 3—one or more of these blocks could be implemented with a more generic processing unit (CPU or GPU), where same block could be reconfigured to perform different processing. Irrespective of the underlying implementation technology, the processes executed by each block exhibit memory efficiency, and often read and write to the same memory location.

Once these calibration, filtering and transformation processing steps are completed the real and imaginary values are converted to distance and amplitude, often by the arctan, sqrt operation described by CORDIC. Once the conversion is completed the final filtering step on the distance value is done, normally to remove outliers.

FIG. 5 shows a schematic diagram of a memory architecture for components used to implement an alternative depth circuit structure to that shown in FIG. 4. In the implementation shown dual pipeline structures are shown which share a common transformation sub-structure.

In this embodiment the dual pipeline memory architecture shown is used to implement processing using two complex frames. In the embodiment shown the transformation applies phase unwrapping to the two complex frames to extend the maximum measurable distance.

Figure 6:
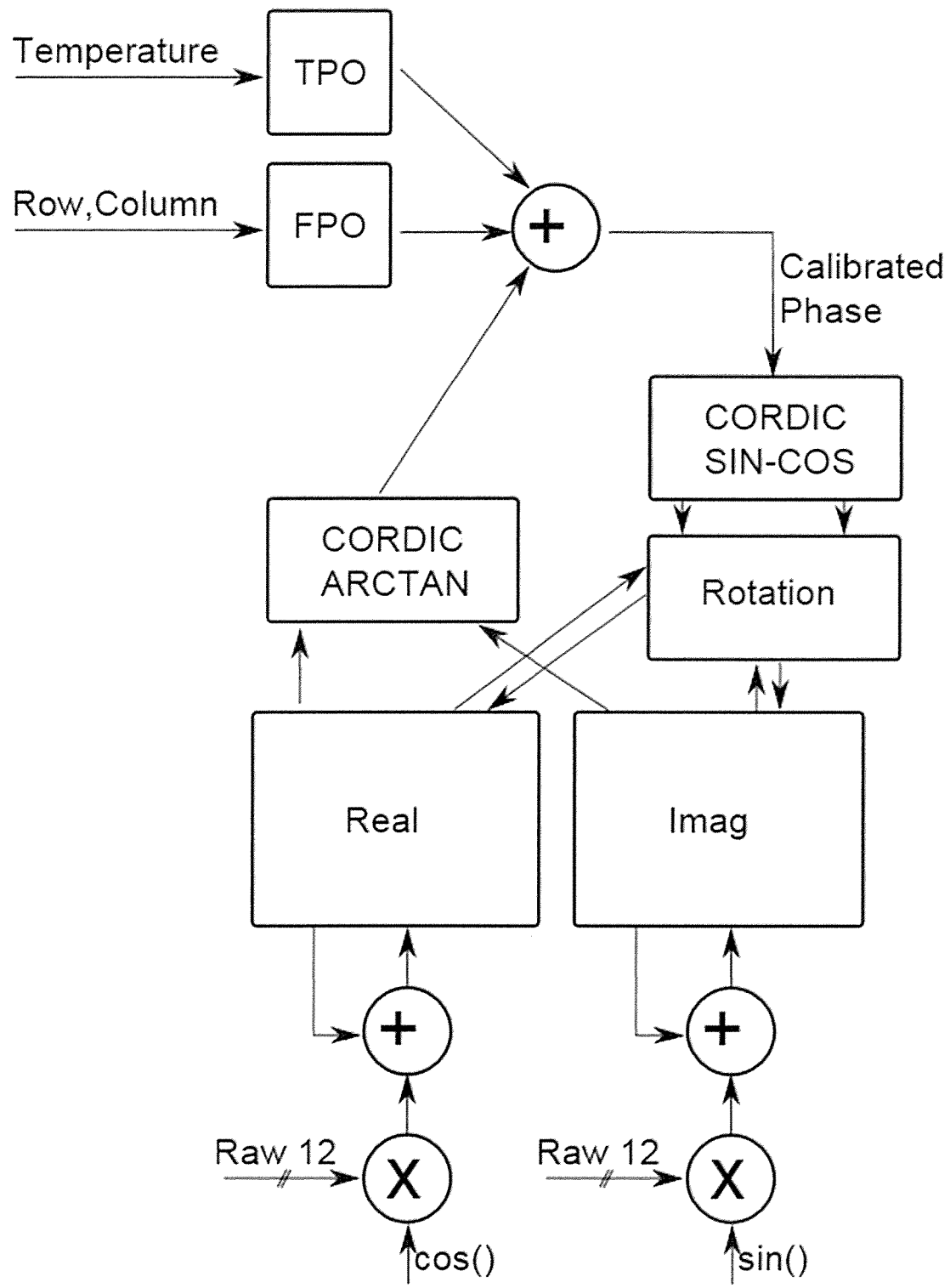
FIG. 6 shows a schematic diagram of components used to implement the calibration sub-structure illustrated within the depth circuit structure of FIG. 4.

FIG. 6 shows a schematic diagram of components used to implement the calibration sub-structure illustrated within the depth circuit structure of FIG. 4.

This calibration sub-structure executes a single calibration function on the complex real and imaginary components of a pixel of a received raw image data frame to apply a correction for fixed phase offset, phase phase offset and temperature phase offset errors.

The real and imaginary values are converted to amplitude and phase using the CORDIC method well known in the art. CORDIC is used because it can compute arctan and sqrt on integer input values efficiently.

There are two inputs to the phase calibration.

The phase calibration due to temperature is calculated using a function dictated by the components used to implement the time of flight sensor and associated illumination systems of the camera and based on the input from an external temperature sensor supplied by the management processor.

The temperature phase offset (TPO), and the fixed phase offset (FPO) is a constant value, and are summed to generate the calibrated phase. The difference from the output phase and calibrated phase is calculated. The sin( ) and cos( ) of the difference is calculated using the CORDIC method. Then the calibration is applied to the real and imaginary values by applying a rotation matrix. This process generates calibrated complex data, which is then written back to the same memory location.

In the preceding description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What I claim is:

1. A time of flight camera data processing system which includes:
a management processor structure capable of communicating configuration information to and/or from a waveform generator used by the time of flight camera, and
a depth circuit structure configured to receive raw image frame data supplied by a sensor of the time of flight camera, the raw image frame data defining an array of pixels,
the depth circuit structure being configured to translate the raw image frame data of one or more pixels into complex components, and the management processor structure being configured to communicate configuration information and/or to issue operational instructions to the depth circuit structure,
the depth circuit structure being arranged to output distance and amplitude information derived from at least one received raw image data frame;
at least one memory structure addressable by either or both of the depth circuit structure and the management processor structure;
wherein the depth circuit structure defines at least one pipeline structure to process raw image data into complex components and to output amplitude and depth information for this image data;
wherein a pipeline structure defines a filtering sub-structure configured to execute a filtering process on the stored complex components of the pixels of received raw image data frames and to store the filtered complex components in the memory structure address or addresses from which the original complex components were obtained prior to the execution of the filtering process;
wherein filter parameters are dynamically adjusted by an estimate of the amount of noise in the complex data;
wherein the estimate of noise is derived from the complex data and/or an external data source.

2. A system as claimed in claim 1 which incorporates a waveform generator.

3. A system as claimed in claim 1 or claim 2 wherein the management processor structure is configured to reprogram, reconfigure or adjust one or more processes run by the depth circuit structure.

4. A system as claimed in claim 1 wherein the depth circuit structure stores the complex components of pixels of received raw image data frames within said at least one memory structure as integer data types.

5. A system as claimed in claim 1 which includes a single memory structure only where the memory locations defined by the memory structure are addressed by both the management processor structure and depth circuit structure.

6. A system as claimed in claim 1 wherein the depth circuit structure defines a plurality of pipeline structures.

7. A system as claimed in claim 1 wherein a pipeline structure defines a complex data translation sub-structure configured to receive and translate raw camera sensor data into complex components and to store said complex components in a memory structure.

8. A system as claimed in claim 1 wherein a pipeline structure defines a distance and amplitude conversion sub-structure configured to convert stored complex components of the pixels of received raw image data frames into associated pixel distance and amplitude information and to output said pixel distance and amplitude information.

9. A system as claimed in claim 1 wherein the filtering processes executed includes any one or combination of median, bilateral, non-local means, wavelet, total variation, and/or linear filtering.

10. A system as claimed in claim 1 wherein a pipeline structure defines a calibration sub-structure which undertakes a calibration process on the stored complex components of the pixels of received raw image data frames and which stores said calibrated complex components in the memory structure address or addresses from which the original complex components were obtained prior to the execution of the calibration process.

11. A system as claimed in claim 10 wherein a calibration sub-structure executes a single calibration function on the complex components of a pixel of a received raw image data frame to apply a correction for fixed phase offset and temperature phase offset errors.

12. A system as claimed in claim 10 wherein the calibration sub-structure receives additional input parameters including any one or more of phase information, internal frame position information for a pixel and/or ambient temperature information.

13. A system as claimed in claim 1 wherein a pipeline structure defines or communicates with a transformation process sub-structure configured to execute a transformation process on the stored complex components of the pixels of received raw image data frames and to store said transformed complex components in the memory structure address or addresses from which the original complex components were obtained prior to the execution of the filtering process.

14. A system as claimed in claim 13 wherein a pipeline structure shares a transformation process sub-structure with at least one other pipeline structure.

15. A system as claimed in claim 14 wherein said transformation process sub-structure is configured to execute any one or more combinations of:
High dynamic range processing
Multi-path interference correction processing
Phase unwrapping processing
Motion correction processing
Binary sequence driven captured image data processing.

* * * * *